(12) United States Patent
Huang et al.

(10) Patent No.: US 7,974,503 B2
(45) Date of Patent: Jul. 5, 2011

(54) FIBER GRATING SENSOR

(75) Inventors: An-Bin Huang, Hsinchu (TW); Sheng-Chiang Kao, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 12/458,233

(22) Filed: Jul. 6, 2009

(65) Prior Publication Data

US 2009/0297089 A1 Dec. 3, 2009

(51) Int. Cl.
*G02B 6/10* (2006.01)
(52) U.S. Cl. ............................................. 385/13; 385/12
(58) Field of Classification Search ............ 385/12, 385/13
See application file for complete search history.

(56) References Cited

U.S. PATENT DOCUMENTS

| 7,266,261 B2 * | 9/2007 | Arias Vidal et al. ............ 385/13 |
| 7,308,165 B2 * | 12/2007 | Arias Vidal et al. ............ 385/13 |

* cited by examiner

*Primary Examiner* — Kevin S Wood
(74) *Attorney, Agent, or Firm* — Rosenberg, Klein & Lee

(57) ABSTRACT

A fiber grating sensor including an elastic circular plate and one or two FBG'ss attached to the bottom surface of the elastic circular plate. Two ends of the FBG are connected to an optic fiber for signal transmission. The fiber grating sensor readouts are independent of temperature variation. The fiber grating sensor mechanism according to the present invention may be applied in a variety of sensors such as gauge pressure transducer, differential pressure transducer, load cell and displacement transducer with a distributive design, and for various purposes.

12 Claims, 5 Drawing Sheets

FIBER GRATING SENSOR

BACKGROUND OF THE INVENTION

1. Field of the Invention

The present invention generally relates to an optic fiber grating sensor, and more particularly relates to an optic fiber Bragg grating (FBG) sensor applied as a gauge pressure transducer, differential pressure transducer, load cell, and displacement transducer.

2. Description of the Prior Art

Conventionally, most electronic pressure sensors or electronic displacement sensors transform the target physical quantity into strain. The strain is then transformed into a current or voltage signal via various forms of electric resistance or vibrating wire strain gages to facilitate data acquisition.

Meanwhile, most electronic pressure sensors or electronic displacement sensors are of non-distributive design; each sensing unit requires a dedicated signal transmission line. Therefore, the application of such sensors is often limited due to excessive number of transmission lines. Furthermore, the electronic signal can be affected by electromagnetic interference (EMI).

In another aspect, the design principle of the exiting pressure sensors using optic FBG employs a cantilever beam as a mechanism to transform the sensed pressure into tensile and compressive strains on the opposite sides of the cantilever beam. Thus, the FBG's attached to the two opposite sides of the cantilever beam experience strains of the same value but with opposite signs. The pressure value is determined by subtracting the peak FBG signal from another. In another method, a single FBG is passed through a neutral layer of the cantilever beam to transform the sensed pressure into a chirped strain. The chirped strain caused a change in the width of the FBG waveform, instead of its peak value. In either case, the cantilever beam must be isolated to achieve the hermetic packaging. A separate diaphragm is required to isolate the cantilever beam from the pressure chamber. Such designs are more complex and less sensitive. Other existing optical fiber sensors are not fabricated by using the FBG's, they are non-distributive and carries all the disadvantages of non-distributive sensors.

SUMMARY OF THE INVENTION

Other advantages of the present invention will become apparent from the following description taken in conjunction with the accompanying drawings wherein are set forth, by way of illustration and example, certain embodiments of the present invention.

One objective of the present invention is to provide a fiber grating sensor including a chirped design and a differential design, and the measurement of the fiber grating sensor is independent from temperature fluctuations.

Another objective of the present invention is to provide a fiber grating sensor that can be configured into various forms including gauge pressure transducer, differential pressure transducer, load cell and displacement transducer with a distributive design.

Therefore, it will be apparent to those of ordinary skill in the art that the present invention has at least the following advantages:

1. A single optical fiber may be used to connect a plurality of sensors in series, and the measurement quality is accurate regardless of the number of the measuring points added.

2. The measured physical loading is applied to a circular plate. The fiber gratings are attached directly to the circular plate to sense the strains resulted from the applied loading. This arrangement enhances the sensitivity of the sensors and quality of the readings.

In accordance with the above objectives and other purposes of the present invention, an embodiment of a fiber grating sensor is provided, which includes an elastic circular plate and an optical fiber attached diametrically to the bottom side of the elastic circular plate to facilitate strain sensing and signal transmission. A single or two FBG(s) are included in the optic fiber at the bottom of the circular plate. When a single FBG is used (to be referred to as the chirped design), the center of this FBG is aligned with the neutral circle of the elastic circular plate. When two FBGs are used (to be referred to as the differential design), the first FBG is attached towards the center of the elastic circular plate; and the second FBG is attached towards the edge of the elastic circular plate.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
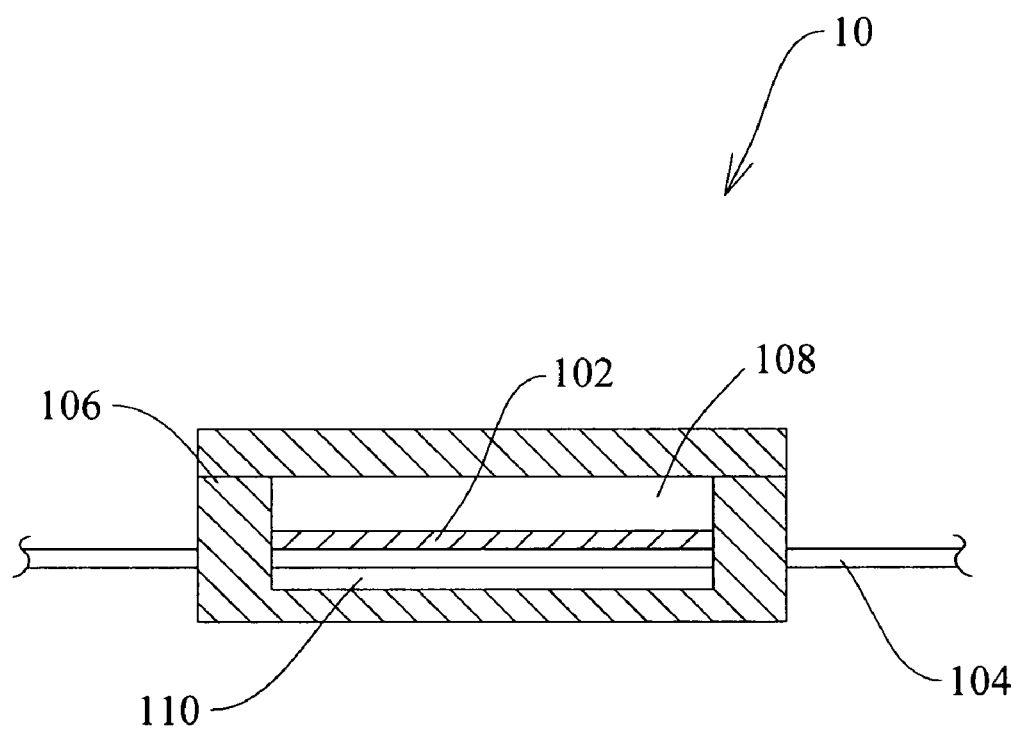
FIGS. 1A, 1B, and 1C are cross-sectional schematic diagrams of various configurations illustrating a fiber grating sensor according to an embodiment of present invention. The configurations shown in FIGS. 1A through 1C can be coupled with either a single FBG (the chirped design) or two FBGs (the differential design) attached at the bottom side of the circulate plate for strain measurements.
Figure 1B:
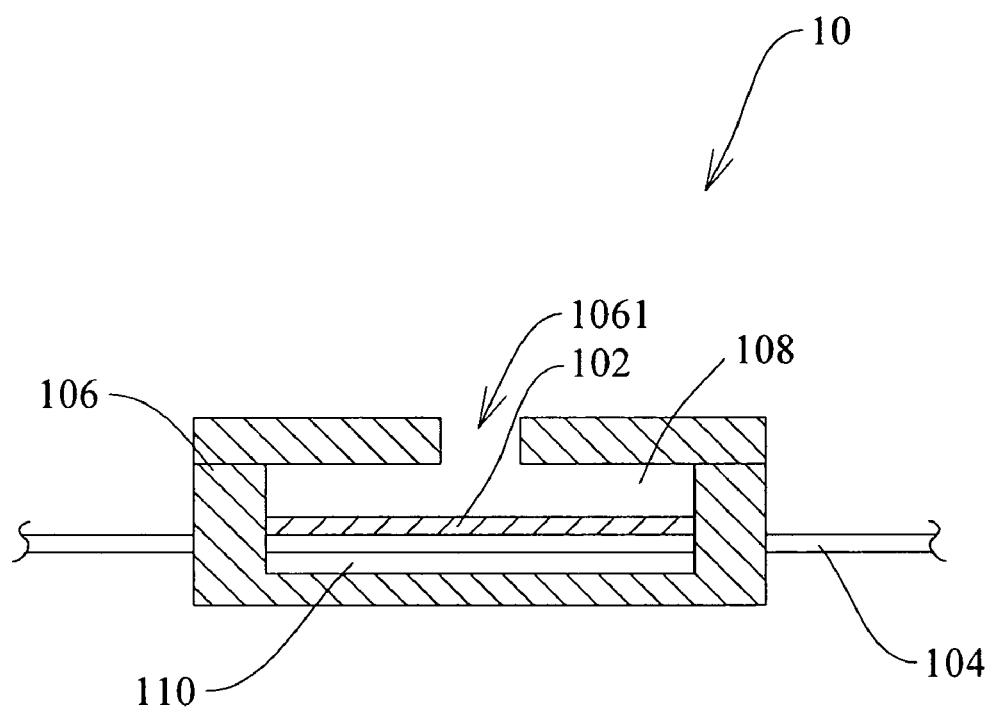
Figure 1C:
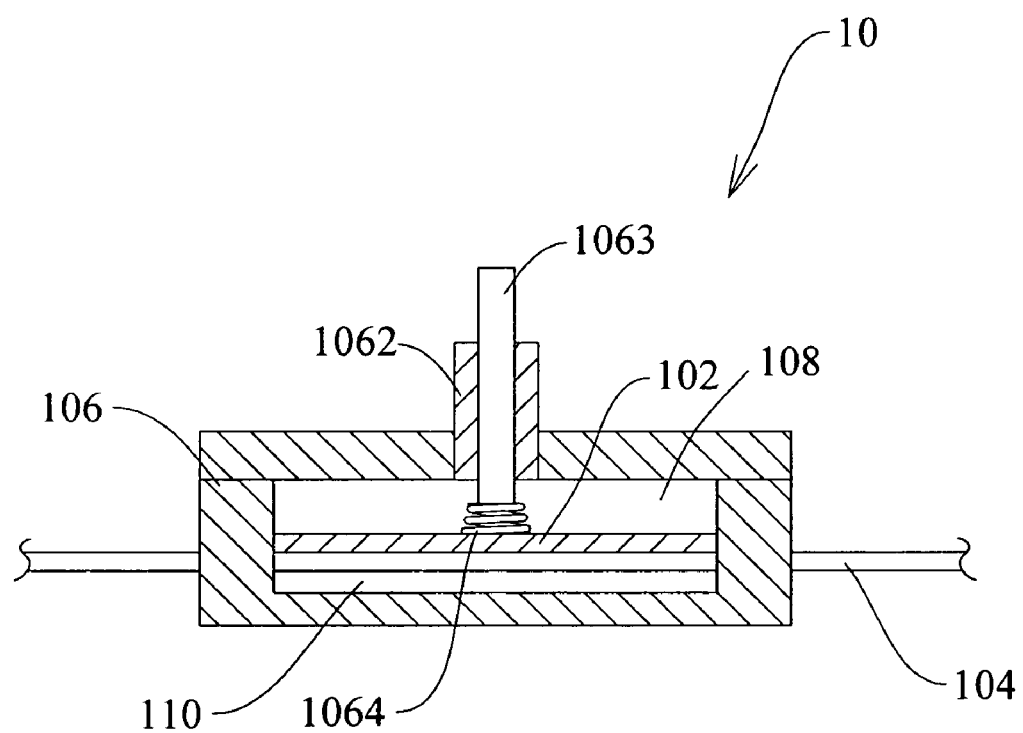

The present invention proposes disposing a single or two FBGs on an elastic circular plate with a restricted edge. FIGS. 1A, 1B, and 1C are cross-sectional schematic diagrams of various configurations illustrating a fiber grating sensor 10 according to an embodiment of present invention.

As shown in the FIGS. 1A through 1C, the fiber grating sensor 10 includes an elastic circular plate 102; and an optical fiber 104 set under the elastic circular plate 102 to transmit signals. The optical fiber 104 includes at least one FBG attached on the bottom surface of the elastic circular plate 102. How and where the FBG(s) are located will be described in FIGS. 2 and 3. In an embodiment, the fiber grating sensor 10 further comprises a rigid shell 106, and the elastic circular plate 102 and the optic fiber 104 are set inside the rigid shell 106. The optical fiber 104 is passed through the rigid shell 106. In FIG. 1A, the embodiment is configured as a pressure transducer, a space 108 located above the top surface of the elastic circular plate 102 inside the rigid shell 106 serves as a pressure chamber such that the applied pressure will induce a strain to the fiber grating through deformation of the circular plate 102. In another aspect of the present invention, a space 110 located under the elastic circular plate 102 inside the rigid shell 106 serves as a reference pressure chamber. The reference pressure chamber is isolated from space 108. When space 110 is exposed to the atmospheric pressure, the fiber grating sensor 10 serves as a gauge pressure transducer. When space 110 is connected to a constant reference pressure, the fiber grating sensor 10 serves as a differential pressure transducer.

In FIG. 1B, the embodiment is configured as a load cell. The rigid shell 106 has a hole 1061 to allow the application of force to the sensor. In this configuration, the spaces 108 and 110 located respectively above and below the elastic circular plate 102 inside the rigid shell 106 are connected to each other and exposed to the same outside pressure. The external force to be sensed applies directly to the center of circular plate 102.

In FIG. 1C, the embodiment is configured as a linear displacement transducer. The rigid shell 106 has a linear bushing 1062 to allow a piston 1063 to pass through rigid shell 106. A spring 1064 connects the piston to the center of the circular plate 102. In this configuration, the spaces 108 and 110 located respectively above and below the elastic circular plate 102 inside the rigid shell 106 are connected to each other and exposed to the same outside pressure. The linear displacement of the piston 1063 causes the spring 1064 to extend (in response to upward displacement of the piston) or compress (in response to downward displacement of the piston). The extension/compression of the spring 1064 exerts corresponding tensile or compressive force to the center of the circular plate 102. For a spring with a constant stiffness, the amount of force exerted to the circular plate 102 is proportional to the magnitude of linear displacement of the piston 1063.

The configurations shown in FIGS. 1A through 1C can be coupled with either a single FBG (the chirped design) or two FBGs (the differential design) attached at the bottom side of the circulate plate for strain measurements. According to the theory of thin plates, when the space 108 above the elastic circular plate with restricted edge is subjected to a vertical force (in cases of a load cell or displacement transducer) or pressure (in case of a pressure transducer), the central portion deforms downwardly in an axisymmetrical fashion, tensile strain will occur at the central portion of the bottom side of the circular plate, and the strain passes through a neutral circle to become compressive near the edge. Alternatively, once the force zone above the elastic circular plate 102 with restricted edge is subjected to a vertical tensile force or suction to cause the central potion to deform upwardly, the strain distribution is reversed. The sensitivity of the fiber grating sensor may be adjusted by changing the radius and/or thickness of the circular plate.

When the radius of the plate is small, for example, the radius of the plate is less than 10 mm; the fiber grating sensor would be suitable for a chirped design. In the other words, a single FBG is used, and a chirped wave form signal will be generated when the transducer is subjected to an external force or pressure.

Figure 2:
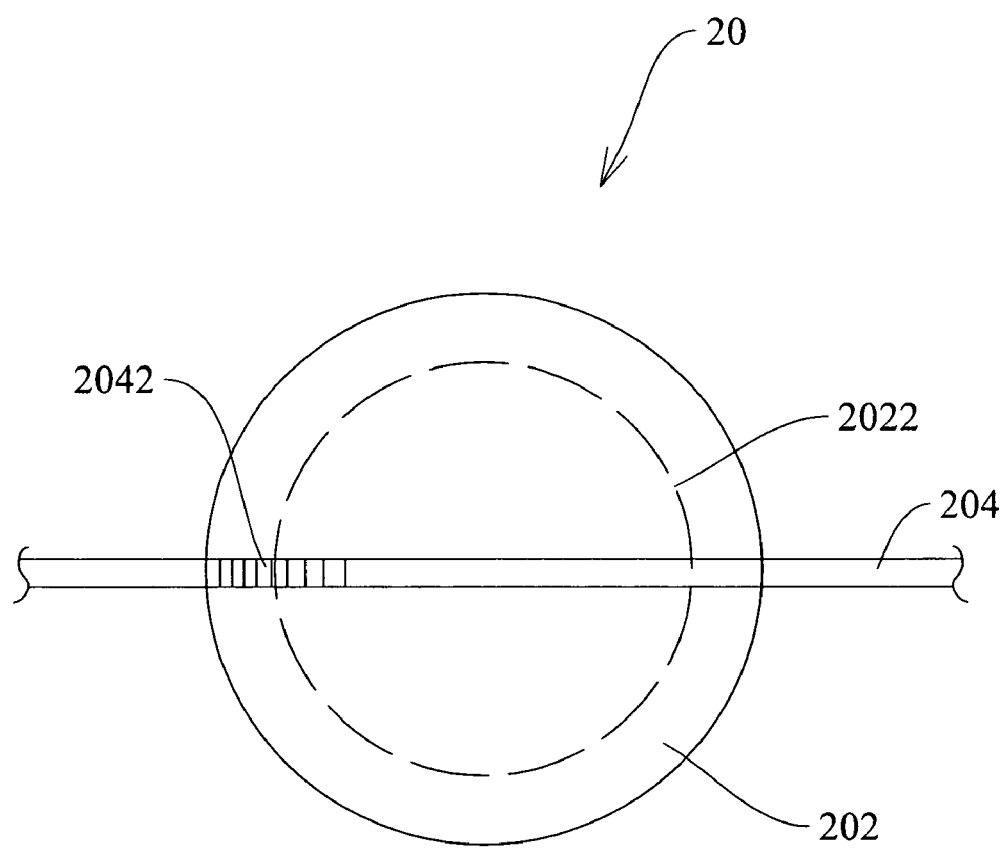
FIG. 2 is a bottom-view schematic diagram illustrating the chirped design with a single FBG according to an embodiment of present invention.

FIG. 2 is a bottom-view schematic diagram illustrating the chirped design 20 for strain measurement according to an embodiment of present invention. As shown in FIG. 2, an optical fiber 204 set diametrically below the elastic circular plate 202 includes a single FBG 2042. The center point of the FBG 2042 is aligned with the neutral circle 2022 of the elastic circular plate 202. When the elastic circular plate 202 is subjected a tensile or compressive force to cause a non-uniform strain distribution on the FBG 2042 attached to the elastic circular plate 202. In this case, the spectrum width of the reflected signal of FBG 2042 is proportional to the magnitude of the deformation of the elastic circular plate 202. On the other hand, if the radius of the plate is large, for example, a radius larger than 20 mm, it may be more suitable for a differential design where two 'FBGs are used.

Figure 3:
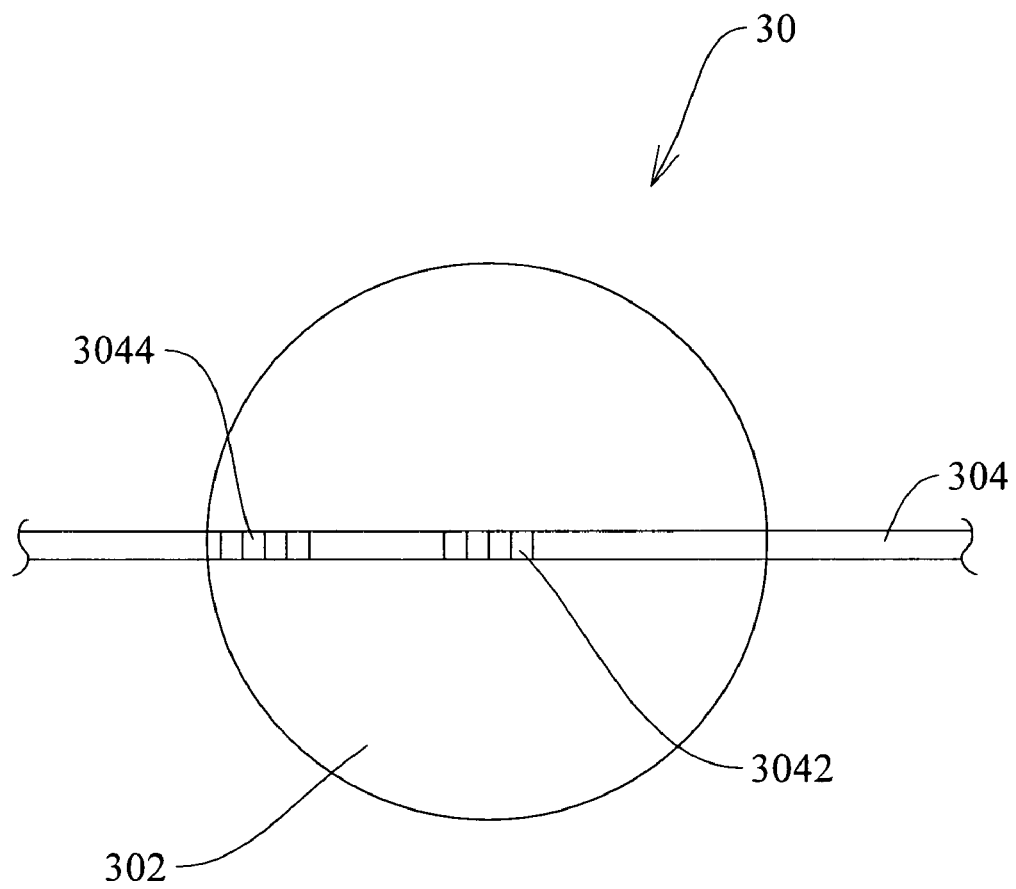
FIG. 3 is a bottom-view schematic diagram illustrating the differential design with two FBGs according to an embodiment of present invention.

FIG. 3 is a bottom-view schematic diagram illustrating the differential design 30 for strain measurement according to an embodiment of present invention. As shown in FIG. 3, an optical fiber 304 set below an elastic circular plate 302 includes a first FBG 3042 and a second FBG 3044. The central point of the first FBG 3042 is attached and aligned with the center of the elastic circular plate 302. The second FBG 3044 is attached on the edge of the bottom surface of the elastic circular plate 302. When the elastic circular plate 302 is subjected to an external force to cause strain, the peaks of the reflective signals from the two FBGs will shift in opposite directions, and the differential value of the peaks is proportional to the deformation of the elastic circular plate 302.

For the chirped design as described above, the peak of the reflective signal of the chirped fiber grating may be shifted due to the temperature variation, but the spectrum width is unaffected. For the differential design as described above, the peaks of the reflective signals from two FBGs may be shifted to the same extent simultaneously due to the temperature variation, but the differential value is unaffected. Therefore, one of the characteristics and advantages of the fiber grating sensor according to the present invention is that the readouts of the both types of strain sensing schemes are independent of the temperature variations.

It will be apparent to those of ordinary skill in the art that the present invention has at least the following advantages.

1. A single optical fiber may comprise a plurality of sensors connected in series, and measurement quality is good regardless of number of measuring points.

2. The sensing components are isolated and well protected. Meanwhile, the measured physical loading on the circular plate is directly measured by the attached FBG(s). The measuring range and sensitivity of the sensor can be adjusted according to requirements.

3. The present invention has a multiplexing feature that can be advantageously applied in a variety of sensors.

For example, the fiber grating sensor of the present invention may be used as a gauge pressure transducer for measuring gas or liquid pressure.

In addition, the fiber grating sensor may be connected with a reference pressure to serve as a differential pressure transducer. Similarly, the fiber grating sensor can serve as a load cell where the external force is applied on the central point of the elastic circular plate.

Furthermore, the fiber grating sensor may serve as a displacement transducer. The displacement value can be read from the relationship between the reflective signal of the FBG(s) and the reactive force.

To sum up, the fiber grating sensor according to the present invention may be applied in a variety of sensors such as gauge pressure transducer, differential pressure transducer, load cell and displacement transducer with distributive capabilities. The fiber grating sensor may be applied in the field of mechanical, medical, civil engineering, defense, and various or industrial purposess where stress, force, or displacement measurements are required.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. An optic fiber grating sensor configured as a displacement transducer, comprising:

an elastic circular plate;

an optical fiber located below the elastic circular plate for signal transmission, wherein the optical fiber comprises a single (chirped design) fiber Bragg grating (FBG) attached to the bottom surface of the elastic circular plate for strain measurements, wherein the elastic circular plate and the FBG are set inside the rigid shell, and the optical fiber passes through the rigid shell; and a piston and a spring connected to the central point of the elastic circular plate, wherein the displacement value of the piston is proportional to a reactive pulling force of the spring and the displacement value is inferred from a relationship between a waveform signal of the FBG and the reactive pulling force exerted on the elastic circular plate.

2. The fiber grating sensor according to claim 1, wherein a space located on top of the elastic circular diaphragm inside the rigid shell serves as a pressure chamber such that an applied pressure or a force can induce strain to the elastic circular plate and then to the FBG; wherein a space under the elastic circular plate inside the rigid shell serves as an isolation chamber; and wherein the isolation chamber is completely sealed such that the FBG is not affected by the external pressure/force except when it is applied through the elastic circular diaphragm.

3. The fiber grating sensor according to claim 1, wherein the fiber grating sensor is a gauge pressure transducer and the isolation chamber is connected to the atmospheric pressure.

4. The fiber grating sensor according to claim 1, wherein the fiber grating sensor is a differential pressure transducer and the isolation chamber is connected to a reference pressure.

5. The fiber grating sensor according to claim 1, wherein the fiber grating sensor is a load cell and the external force is applied to a central point of the elastic circular diaphragm.

6. The fiber grating sensor according to claim 1, wherein the pressure exerted to the elastic circular plate causes a change in a width of a waveform reflected from the chirped FBG and the width of the waveform reflected from the chirped FBG is independent from temperature fluctuation.

7. A fiber grating sensor configured as a displacement transducer, comprising:

an elastic circular plate;

an optical fiber located below the elastic circular plate for signal transmission, wherein the optical fiber comprises a first fiber Bragg grating (FBG) and a second FBG disposed below the elastic circular plate, wherein a piston and a spring is connected to the center of the elastic circular plate, a displacement value of the piston is proportional to a reactive pulling force of the spring and the displacement value is inferred from a relationship between a waveform signal of the FBGs and the reactive pulling force exerted on the elastic circular plate;

wherein the first FBG is aligned with a center of the elastic circular plate; and wherein the second FBG is attached proximate to the edge of the elastic circular plate; and a rigid shell, wherein the elastic circular plate and the first FBG and the second FBG are set inside the rigid shell, and the optical fiber passes through the rigid shell.

8. The fiber grating sensor according to claim 7, wherein a space located above the elastic circular plate inside the rigid shell serves as a pressure chamber such that the applied pressure or force can induce strain to the elastic circular plate and then to the first and second FBGs; wherein a space under the elastic circular diaphragm inside the rigid shell serves as an isolation chamber; and wherein the isolation chamber is completely sealed such that the first and second FBGs are not affected by external pressure/force except when it is applied through the elastic circular diaphragm.

9. The fiber grating sensor according to claim 7, wherein the fiber grating sensor serves as a gauge pressure transducer and the isolation chamber is exposed to the atmospheric pressure.

10. The fiber grating sensor according to claim 7, wherein the fiber grating sensor serves as a differential pressure transducer and the isolation chamber is connected to a reference pressure.

11. The fiber grating sensor according to claim 7, wherein the fiber grating sensor serves as a load cell and the external force is applied to a center of the elastic circular plate.

12. The fiber grating sensor according to claim 7, wherein the physical quantity to be sensed is read by a difference in peak waveforms between the first FBG and the second FBG, and wherein the differential value of the peak waveforms between the first FBG and the second fiber FBG is independent from temperature fluctuation.

* * * * *